(12) United States Patent
Dunbar et al.

(10) Patent No.: US 6,552,880 B1
(45) Date of Patent: Apr. 22, 2003

(54) DISK DRIVE COMPRISING THERMAL ASPERITY PROTECTION BY REDUCING AN ELECTRICAL BIAS SUPPLIED TO A MAGNETO-RESISTIVE HEAD

(75) Inventors: Gary L. Dunbar, Gilroy, CA (US); David M. Hannon, Palo Alto, CA (US); James Weispfenning, Rochester, MN (US); Jodie A. Christner, Rochester, MN (US); Timothy Bouwkamp, Colorado Springs, CO (US)

(73) Assignee: Western Digital Technologies, Inc., Lake Forest, CA (US)

( * ) Notice: Subject to any disclaimer, the term of this patent is extended or adjusted under 35 U.S.C. 154(b) by 277 days.

(21) Appl. No.: 09/773,969

(22) Filed: Jan. 31, 2001

(51) Int. Cl.$^7$ ................................................ G11B 5/127
(52) U.S. Cl. ...................................................... 360/323
(58) Field of Search ........................... 360/323, 66, 61, 360/25

(56) References Cited

U.S. PATENT DOCUMENTS

| | | |
|---|---|---|
| 5,793,207 A | 8/1998 | Gill |
| 6,038,091 A | 3/2000 | Reed et al. |
| 6,069,761 A | 5/2000 | Stupp |

*Primary Examiner*—Allen Cao
(74) *Attorney, Agent, or Firm*—Milad G. Shara, Esq.; Howard H. Sheerin, Esq.

(57) ABSTRACT

The present invention may be regarded as a disk drive with protection against damage due to a thermal asperity. The disk drive comprises a disk having a surface with an asperity, and a magneto-resistive head actuated radially over the surface of the disk for generating a read signal comprising a thermal asperity component caused by the magneto-resistive head contacting the asperity on the surface of the disk. A bias generator is provided for generating an electrical bias applied to the magneto-resistive head, and a thermal asperity detector detects the thermal asperity component in the read signal. When the thermal asperity component is detected, the electrical bias is reduced for a time interval, thereby protecting the magneto-resistive head.

15 Claims, 5 Drawing Sheets

DISK DRIVE COMPRISING THERMAL ASPERITY PROTECTION BY REDUCING AN ELECTRICAL BIAS SUPPLIED TO A MAGNETO-RESISTIVE HEAD

BACKGROUND OF THE INVENTION

1. Field of the Invention

The present invention relates to disk drives for computer systems. More particularly, the present invention relates to a disk drive comprising thermal asperity protection by reducing an electrical bias supplied to a magneto-resistive head.

2. Description of the Prior Art

Disk drives employing the Spin Valve implementation of a Giant Magneto-Resistive head are susceptible to asperities manifesting on the surface of the disk. When the head strikes the asperity, its temperature can increase dramatically which is why the asperity is referred to as a thermal asperity. If the head's temperature exceeds a threshold known as the "blocking temperature", the stability of the pinning field is reduced, and as the head cools, the arbitrary magnetic flux emanating from the surface of the disk can permanently change the magnetic orientation of the pinning field rendering the head inoperable.

U.S. Pat. No. 6,069,761 discloses a prior art technique for protecting against thermal asperities by increasing the bias current applied to the head during the thermal asperity event. Increasing the bias current saturates the magnetic field affecting the head so that it is substantially unaffected by the arbitrary magnetic flux emanating from the surface of the disk as the head cools. However, increasing the bias current to saturate the magnetic field further increases the temperature of the head, thereby extending the duration of the thermal asperity event. This is undesirable since the data immediately following the thermal asperity cannot be recovered until the affect of the thermal asperity dissipates. Moreover, increasing the bias current will not protect a giant-magneto-resistive head operating in the "oppose" mode wherein the preferred orientation of the pinning field opposes the bias current field. When a thermal asperity causes the temperature of the head to exceed the blocking temperature, the bias current field may cause the orientation of the pinning field to partially reverse direction until the head cools and the pinning layer magnetic properties become dominate. If the temperature exceeds the blocking temperature for an extended period, the pinning field reversal may be so substantially that it may not reorient to the preferred direction once the head cools. Increasing the bias current during the thermal asperity event, as in the '761 patent, exacerbates this problem.

There is, therefore, a need to protect against thermal asperities in disk drives employing a magneto-resistive head operating in the oppose mode.

SUMMARY OF THE INVENTION

The present invention may be regarded as a disk drive with protection against damage due to a thermal asperity. The disk drive comprises a disk having a surface with an asperity, and a magneto-resistive head actuated radially over the surface of the disk for generating a read signal comprising a thermal asperity component caused by the magneto-resistive head contacting the asperity on the surface of the disk. A bias generator is provided for generating an electrical bias applied to the magneto-resistive head, and a thermal asperity detector detects the thermal asperity component in the read signal. When the thermal asperity component is detected, the electrical bias is reduced for a time interval, thereby protecting the magneto-resistive head.

In one embodiment, when the thermal asperity is detected a timer is started and ran for the duration of the time interval. In one embodiment, the timer comprises a programmable time interval that is optimized relative to the characteristics of the disk drive. In another embodiment, the thermal asperity detector comprises a threshold detector for sensing when a dc component of the read signal exceeds a predetermined threshold, wherein the electrical bias is reduced while the dc component exceeds the predetermined threshold. In one embodiment, the electrical bias is reduced to zero for at least part of the time interval, and in another embodiment a polarity of the electrical bias is reversed for at least part of the time interval.

The present invention may also be regarded as a method for protecting a magneto-resistive head in a disk drive against damage due to a thermal asperity caused by the magneto-resistive head contacting an asperity on a surface of a disk. The magneto-resistive head is actuated radially over the surface of the disk and an electrical bias is supplied to the magneto-resistive head. The magneto-resistive head generates a read signal comprising a thermal asperity component due to the magneto-resistive head contacting the asperity on the surface of the disk. The thermal asperity component in the read signal is detected, and when detected, the electrical bias is reduced for a time interval, thereby protecting the magneto-resistive head.

DESCRIPTION OF THE PREFERRED EMBODIMENTS

Figure 2:
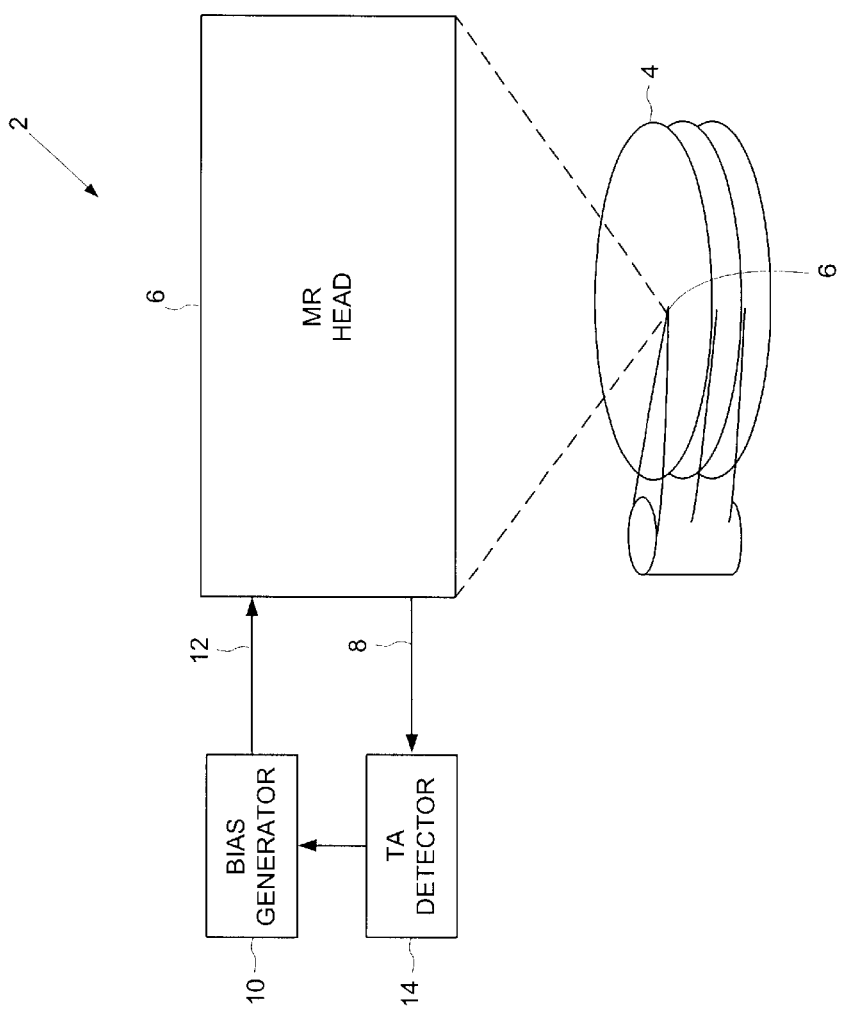
FIG. 2 shows a disk drive according to an embodiment of the present invention comprising a bias generator for generating an electrical bias applied to a magneto-resistive head and a thermal asperity detector, wherein the electrical bias is reduced when a thermal asperity is detected in order to protect the magneto-resistive head.

FIG. 2 shows a disk drive 2 according to an embodiment of the present invention with protection against damage due to a thermal asperity. The disk drive 2 comprises a disk 4 having a surface with an asperity, and a magneto-resistive head 6 actuated radially over the surface of the disk 4 for generating a read signal 8 comprising a thermal asperity component caused by the magneto-resistive head 6 contacting the asperity on the surface of the disk 4. A bias generator 10 is provided for generating an electrical bias 12 applied to the magneto-resistive head 6, and a thermal asperity (TA) detector 14 detects the thermal asperity component in the read signal 8. When the thermal asperity component is detected, the electrical bias 12 is reduced for a time interval, thereby protecting the magneto-resistive head 6.

Figure 1:
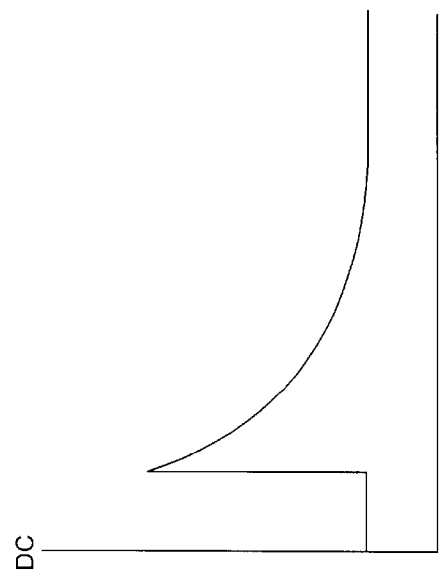
FIG. 1 illustrates how a thermal asperity causes a sudden increase in the DC component of the read signal generated by a magneto-resistive head which decays exponentially as the head cools.

FIG. 1 illustrates how a thermal asperity causes a sudden increase in the DC component of the read signal 8 generated by a magneto-resistive head 6 which decays exponentially as the head 6 cools. Reducing the electrical bias 12 supplied to the magneto-resistive head 6 during a thermal asperity event reduces the heat affecting the head 6 by reducing the heat generated by the electrical bias 12. Further, reducing the electrical bias 12 reduces the magnitude of the destabilizing field created by the electrical bias 12 when the magneto-resistive head 6 is operating in the oppose mode (i.e., when the preferred orientation of the pinning field opposes the bias current field).

Figure 3:
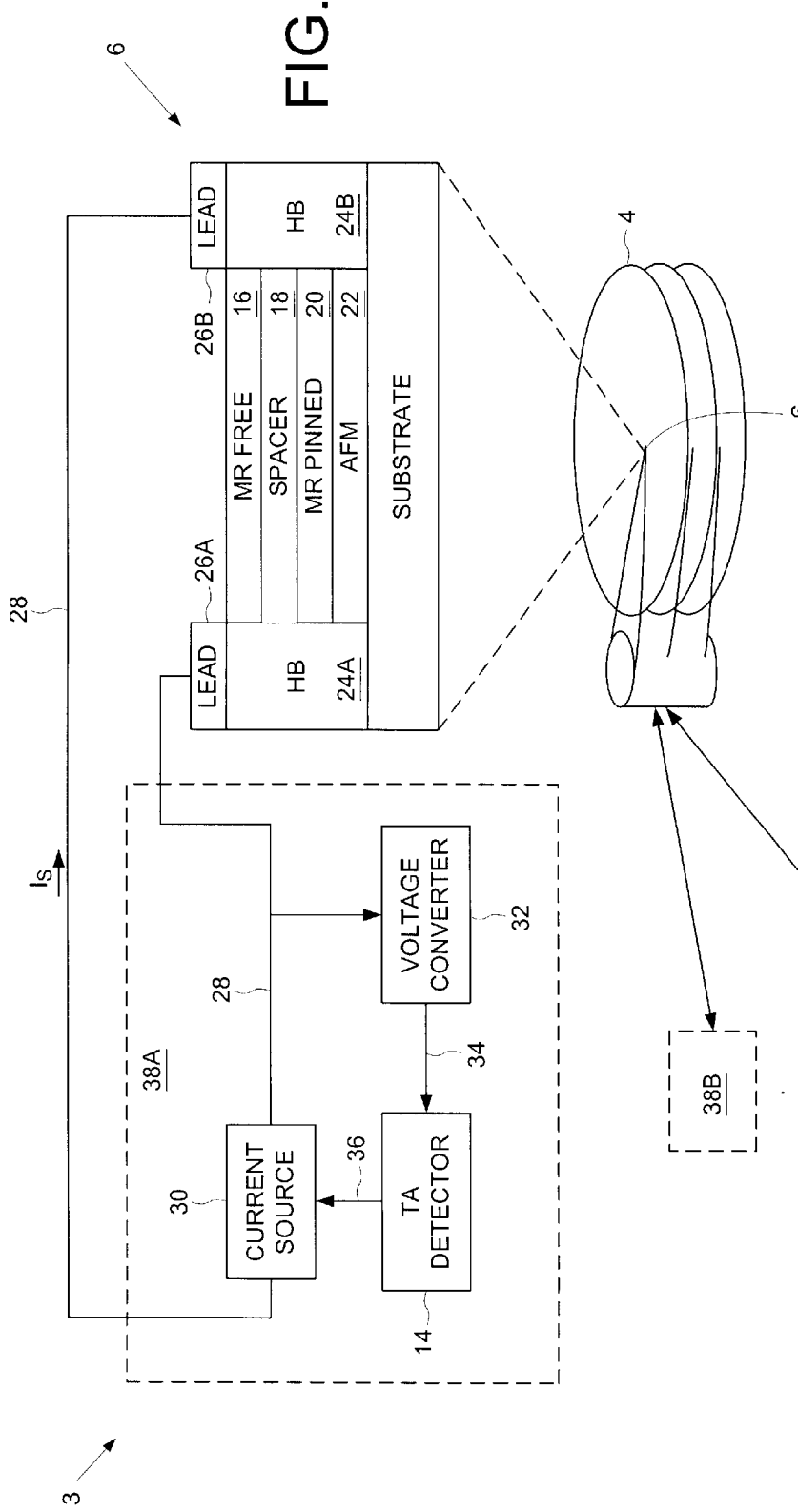
FIG. 3 shows details of a magneto-resistive head according to an embodiment of the present invention as comprising a magneto-resistive free layer, a spacer, a magneto-resistive pinning layer and an antiferromagnetic (AFM) layer.

FIG. 3 shows a magneto-resistive head 6 according to an embodiment of the present invention. The magneto-resistive head 6 comprises a magneto-resistive (MR) free layer 16 separated from a MR pinned layer 20 by a non-magnetic, electrically conducting spacer 18. The magnetization of the MR pinned layer 20 is fixed by an antiferromagnetic (AFM) layer 22. The magneto-resistive head 6 further comprises hard bias (FIB) layers 24A and 24B which provide a longitudinal bias for the MR free layer 16 and the MR pinned layer 20. Leads 26A and 26B are formed over the HB layers 24A and 24B, respectively, to provide an electrical connection for the flow of a sense current $I_s$ 28.

Figure 4:
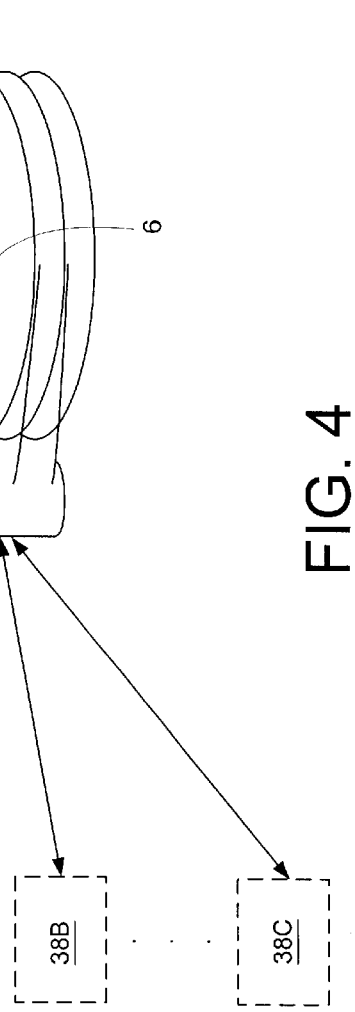
FIG. 4 shows a disk drive according to an embodiment of the present invention wherein the electrical bias supplied to the magneto-resistive head is a sense current, and the read signal is generated by converting the sense current into a voltage.

FIG. 4 shows a disk drive 3 according to an embodiment of the present invention employing the magneto-resistive head 6 of FIG. 3, wherein the bias generator 10 of FIG. 2 comprises a current source 30 for generating the sense current $I_s$ 28 supplied to the magneto-resistive head 6 via leads 26A and 26B. That is, the electrical bias 12 of FIG. 2 comprises the sense current $I_s$ 28. A voltage converter 32 converts the sense current $I_s$ 28 into a voltage signal 34 representing the read signal 8 of FIG. 2. The TA detector 14 processes the voltage signal 34 to detect the occurrence of a thermal asperity component in the read signal. When a thermal asperity component is detected, the TA detector activates control signal 36 in order to reduce the sense current $I_s$ 28.

In FIG. 4, the current source 30, voltage converter 32, and TA detector 14 are collectively designated by dashed box 38A, and this circuitry is duplicated within dashed boxes 38B and 38C for each magneto-resistive head 6 employed in the disk drive 3. Thus, each magneto-resistive head 6 is continuously monitored and protected by circuitry 38A–38C regardless as to which head 6 is active during a read or write operation. In an alternative embodiment, the circuitry in dashed box 38A is not duplicated, and only the active head is monitored for thermal asperity events.

Figure 5A:
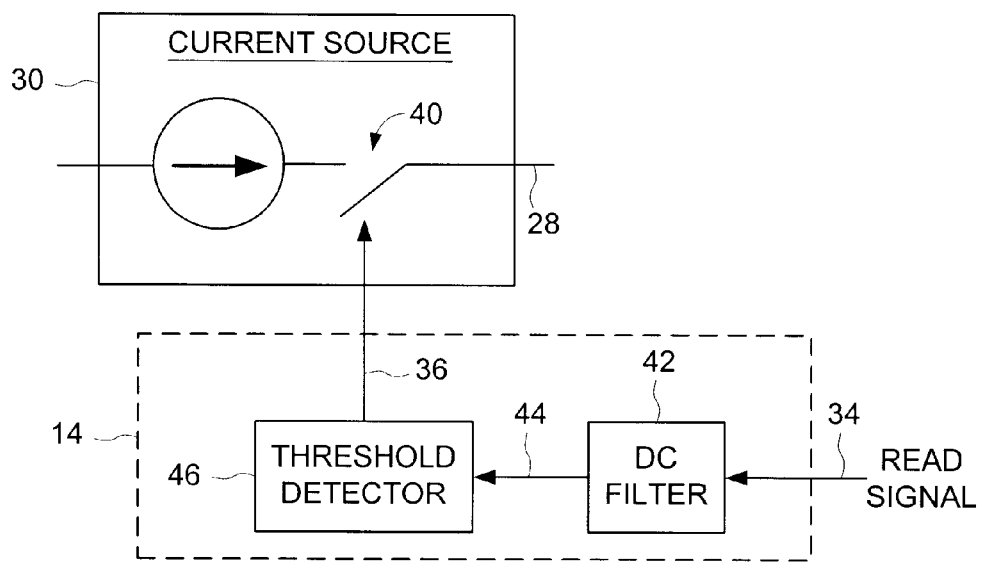
FIG. 5A shows an embodiment of the present invention wherein the thermal asperity detector comprises a DC filter for extracting a DC component of the read signal, and a threshold detector for comparing the DC component to a threshold, wherein the current source is disabled (sense current set to zero) while the DC component exceeds the threshold.

FIG. 5A shows details of a current source 30 and TA detector 14 according to one embodiment of the present invention. The current source 30 generates a sense current 28 supplied to the magneto-resistive head 6. The sense current 28 is turned off when a thermal asperity is detected. Any suitable method for turning off the sense current may be employed, and in the embodiment of FIG. 5A, a switch 40 is opened via a control signal 36 generated by the TA detector 14. The TA detector 14 of FIG. 5A comprises a DC filter 42 for extracting a DC component 44 from the read signal 34. A threshold detector 46 compares the DC component 44 of the read signal 34 to a predetermined threshold. While the DC component 44 exceeds the threshold, a thermal asperity is detected and the switch 40 is opened.

Figure 5B:
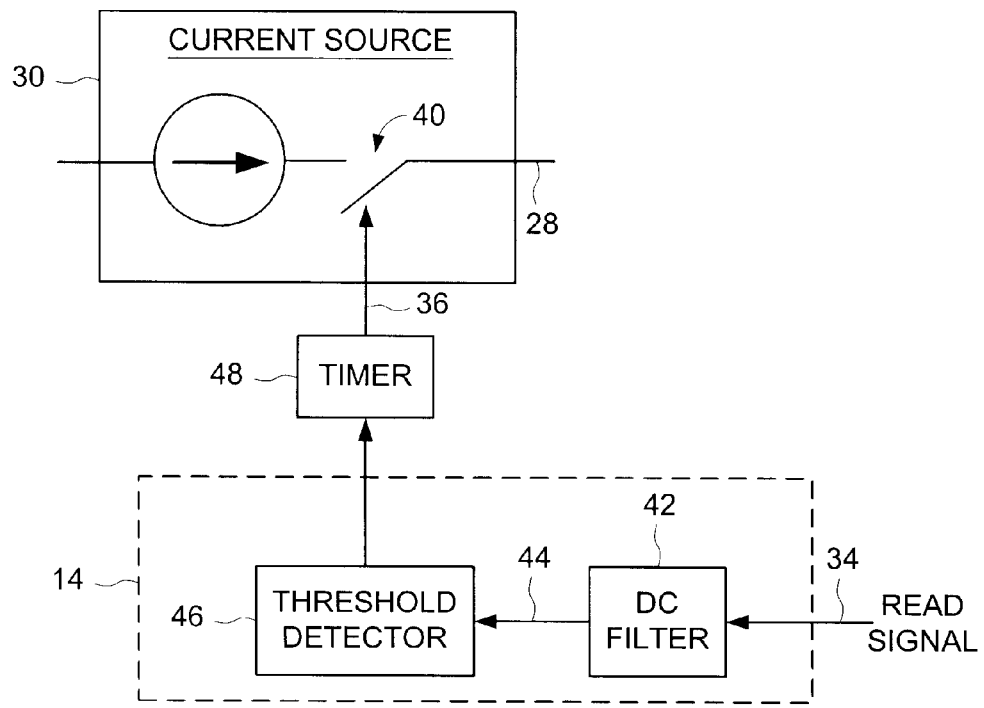
FIG. 5B shows an embodiment of the present invention wherein a timer disables the current source for a time interval when a thermal asperity is detected.

FIG. 5B shows an alternative embodiment of the present invention wherein the disk drive further comprises a timer 48 for generating the control signal 36 which opens the switch 40. When the DC component 44 of the read signal 34 exceeds a predetermined threshold, the threshold detector 46 enables the timer 48, and the timer 48 opens the switch 40 for a predetermined time interval. In one embodiment, the time interval is programmable. This allows the time interval to be optimized according to the characteristics of the disk drive which affect the decay time of the thermal asperity as illustrated in FIG. 1.

Figure 6A:
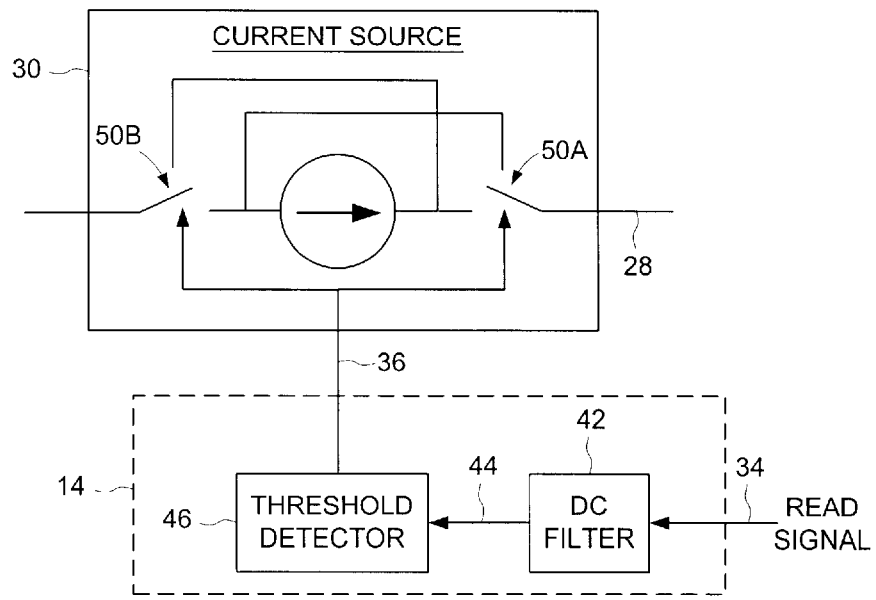
FIG. 6A shows an embodiment of the present invention wherein a polarity of the sense current is reversed while the DC component of the read signal exceeds a predetermined threshold.

FIG. 6A shows an alternative embodiment of the present invention wherein the current source 30 is capable of reversing the polarity of the sense current 28. Any suitable method for reversing the polarity of the sense current 28 may be employed, and in the embodiment of FIG. 6A, two switches 50A and 50B are used to reverse the polarity via control signal 36 generated by the TA detector 14. While the DC component 44 exceeds the predetermined threshold, control signal 36 configures the switches 50A and 50B in order to reverse the polarity of the sense current 28. Reversing the polarity of the sense current 28 aligns the bias current field with the pinning field which helps maintain the proper magnetic orientation of the MR pinned layer 20 when the temperature exceeds the blocking temperature. When the affect of the thermal asperity dissipates and the head 6 cools below the blocking temperature, the switches 50A and 50B are configured to reverse the polarity of the sense current 28, thereby re-aligning the bias current field to oppose the pinning field.

Figure 6B:
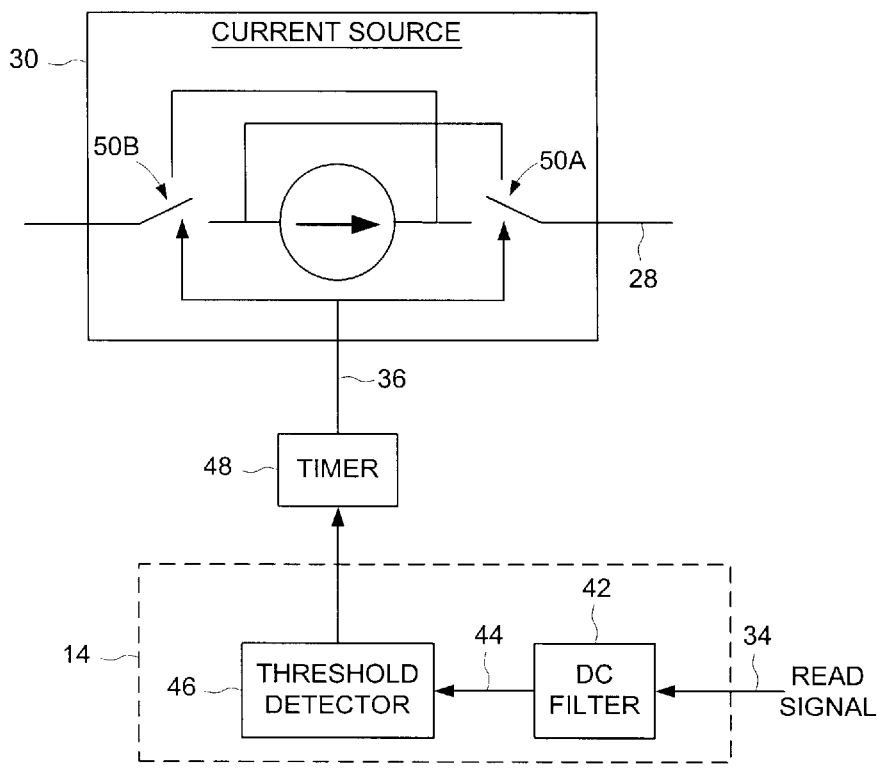
FIG. 6B shows an embodiment of the present invention wherein a timer reverses the polarity of the sense current for a time interval when a thermal asperity is detected.

FIG. 6B shows an alternative embodiment of the present invention wherein the disk drive further comprises a timer 48 for generating the control signal 36 which configures the switches 50A and 50B. When the DC component 44 of the read signal 34 exceeds a predetermined threshold, the threshold detector 46 enables the timer 48, and the timer 48 configures the switches 50A and 50B to reverse the polarity of the sense current 28 for a predetermined time interval. In one embodiment, the time interval is programmable. This allows the time interval to be optimized according to the characteristics of the disk drive which affect the decay time of the thermal asperity as illustrated in FIG. 1.

Figure 7:
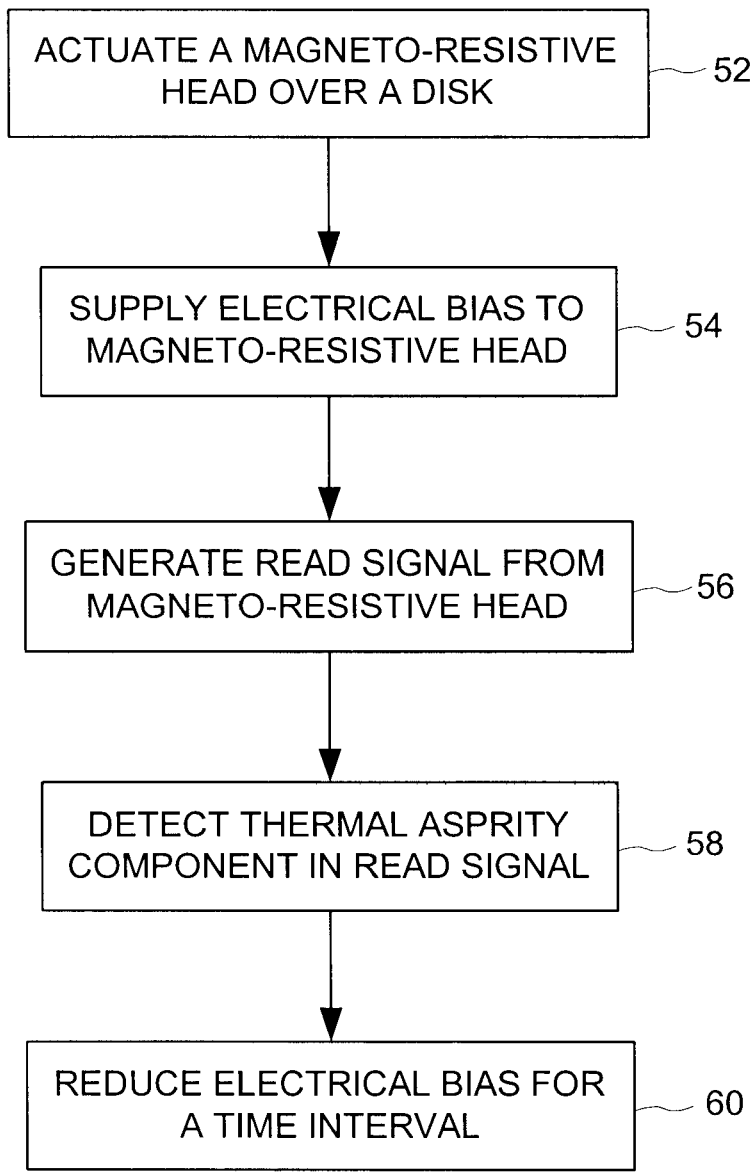
FIG. 7 illustrates a method for protecting a magneto-resistive head within a disk drive according to an embodiment of the present invention by reducing an electrical bias supplied to the magneto-resistive head when a thermal asperity is detected.

FIG. 7 shows a flow diagram according to a method embodiment of the present invention for protecting a magneto-resistive head in a disk drive against damage due to a thermal asperity, caused by the magneto-resistive head contacting an asperity on a surface of a disk. At step 52 the magneto-resistive head 6 is actuated radially over the surface of the disk 4 (see FIG. 2). At step, 54 an electrical bias is supplied to the magneto-resistive head 6, and at step 56 the magneto-resistive head 6 generates a read signal comprising a thermal asperity component due to the magneto-resistive head 6 contacting the asperity on the surface of the disk 4. At step 58 the thermal asperity component in the read signal is detected, and when detected at step 60, the electrical bias is reduced for a time interval, thereby protecting the magneto-resistive head 6.

We claim:

1. A disk drive with protection against damage due to a thermal asperity, comprising:
   (a) a disk having a surface with an asperity;
   (b) a magneto-resistive head actuated radially over the surface of the disk for generating a read signal comprising a thermal asperity component caused by the magneto-resistive head contacting the asperity on the surface of the disk;
   (c) a bias generator for generating an electrical bias applied to the magneto-resistive head; and
   (d) a thermal asperity detector for detecting the thermal asperity component in the read signal;
      wherein when the thermal asperity component is detected, the electrical bias is reduced for a predetermined time interval, thereby protecting the magneto-resistive head.

2. The disk drive as recited in claim 1, wherein the electrical bias is a bias current.

3. The disk drive as recited in claim 1, wherein the electrical bias is a bias voltage.

4. The disk drive as recited in claim 1, further comprising a timer for timing the predetermined time interval, wherein the timer is started when the thermal asperity is detected.

5. The disk drive as recited in claim 4, wherein the timer comprises a programmable time interval.

6. The disk drive as recited in claim 1, wherein the thermal asperity detector comprises a threshold detector for sensing when a dc component of the read signal exceeds a predetermined threshold, wherein the electrical bias is reduced while the dc component exceeds the predetermined threshold.

7. The disk drive as recited in claim 1, wherein the electrical bias is reduced to zero for at least part of the predetermined time interval.

8. The disk drive as recited in claim 1, wherein a polarity of the electrical bias is reversed for at least part of the predetermined time interval.

9. A method for protecting a magneto-resistive head in a disk drive against damage due to a thermal asperity caused by the magneto-resistive head contacting an asperity on a surface of a disk, the method comprising the steps of:
   (a) actuating the magneto-resistive head radially over the surface of the disk;
   (b) supplying an electrical bias to the magneto-resistive head, the magneto-resistive head generating a read signal comprising a thermal asperity component due to the magneto-resistive head contacting the asperity on the surface of the disk;
   (c) detecting the thermal asperity component in the read signal; and
   (d) when the thermal asperity component is detected, reducing the electrical bias for a predetermined time interval, thereby protecting the magneto-resistive head.

10. The method for protecting a magneto-resistive head in a disk drive against damage due to a thermal asperity as recited in claim 9, wherein the step of supplying the electrical bias to the magneto-resistive head comprises the step of supplying a bias current to the magneto-resistive head.

11. The method for protecting a magneto-resistive head in a disk drive against damage due to a thermal asperity as recited in claim 9, wherein the step of supplying the electrical bias to the magneto-resistive head comprises the step of supplying a bias voltage to the magneto-resistive head.

12. The method for protecting a magneto-resistive head in a disk drive against damage due to a thermal asperity as recited in claim 9, further comprising the step of restoring the electrical bias after the predetermined time interval.

13. The method for protecting a magneto-resistive head in a disk drive against damage due to a thermal asperity as recited in claim 9, wherein the step of detecting the thermal asperity component comprises the step of comparing a dc component of the read signal to a predetermined threshold.

14. The method for protecting a magneto-resistive head in a disk drive against damage due to a thermal asperity as recited in claim 9, wherein the step of reducing the electrical bias comprises the step of reducing the electrical bias to zero for at least part of the predetermined time interval.

15. The method for protecting a magneto-resistive head in a disk drive against damage due to a thermal asperity as recited in claim 9, wherein the step of reducing the electrical bias comprises that the step of reversing a polarity of the electrical bias for at least part of the predetermined time interval.

\* \* \* \* \*